(12) United States Patent
Guo et al.

(10) Patent No.: US 11,328,160 B2
(45) Date of Patent: May 10, 2022

(54) VIDEO CONDENSATION AND RECOGNITION METHOD AND SYSTEM THEREOF

(71) Applicant: ioNetworks INC., New Taipei (TW)

(72) Inventors: Jing-Ming Guo, New Taipei (TW); Ting Lin, New Taipei (TW); Herleeyandi Markoni, Bali (ID); Albert Christianto, East Java (ID); Cheng-En Tsai, New Taipei (TW); Hong-Yi Liang, New Taipei (TW); Yi-Hsiang Lin, New Taipei (TW); Shao-Xiong Weng, New Taipei (TW); Chih-Hung Wang, New Taipei (TW); Po-Cheng Huang, New Taipei (TW); Jeffry Susanto, East Java (ID)

(73) Assignee: IONETWORKS INC., New Taipei (TW)

( * ) Notice: Subject to any disclaimer, the term of this patent is extended or adjusted under 35 U.S.C. 154(b) by 0 days.

(21) Appl. No.: 16/898,058

(22) Filed: Jun. 10, 2020

(65) Prior Publication Data

US 2021/0390309 A1 Dec. 16, 2021

(51) Int. Cl.
*G06T 7/00* (2017.01)
*G06K 9/00* (2022.01)
(Continued)

(52) U.S. Cl.
CPC ....... *G06K 9/00718* (2013.01); *G06K 9/6267* (2013.01); *G06T 7/194* (2017.01);
(Continued)

(58) Field of Classification Search
CPC ............ G06K 9/00751; G06K 9/00758; G06T 2207/10016; G06T 2207/30232; G06T 2207/30241; G06T 7/20
See application file for complete search history.

(56) References Cited

U.S. PATENT DOCUMENTS

| 2010/0092037 | A1* | 4/2010 | Peleg | ................... | G11B 27/034 |
| | | | | | 382/103 |
| 2017/0092330 | A1* | 3/2017 | Tsai | ................... | G06K 9/00751 |

(Continued)

OTHER PUBLICATIONS

T. Ruan, S. Wei, J. Li and Y. Zhao, "Rearranging Online Tubes for Streaming Video Synopsis: A Dynamic Graph Coloring Approach," in IEEE Transactions on Image Processing, vol. 28, No. 8, pp. 3873-3884, Aug. 2019, doi: 10.1109/TIP.2019.2903322.*

(Continued)

*Primary Examiner* — Li Liu
(74) *Attorney, Agent, or Firm* — Chun-Ming Shih; Lanway IPR Services (57) ABSTRACT

A video condensation & recognition method and a system thereof are used to detect objects in input frames, derive a 3D object trajectory from which one or multiple 2D trajectories with object tubes are extracted, and catch a time position that refers to non-overlapping condition of object tubes for rearrangement of several continuous object tubes and creation of a condensed video. The generated condensed video can be adjusted by the user in the range of longest detected object tube to the generated condensed video length that is very beneficial for video analysis process. Moreover, a searched attribute of an object in a condensed video is classified for the filtering process which is able to display an object correlated with a distinct searched attribute on the condensed video.

16 Claims, 13 Drawing Sheets

(51) Int. Cl.
    *G06T 7/70*       (2017.01)
    *G06T 7/194*     (2017.01)
    *G06K 9/62*       (2022.01)
    *G06T 7/90*       (2017.01)

(52) U.S. Cl.
    CPC ............... *G06T 7/70* (2017.01); *G06T 7/90* (2017.01); *G06T 2207/10016* (2013.01); *G06T 2207/10024* (2013.01); *G06T 2207/20084* (2013.01)

(56) References Cited

U.S. PATENT DOCUMENTS

| | | | |
|---|---|---|---|
| 2018/0130498 A1* | 5/2018 | Tsai | G11B 27/28 |
| 2018/0254064 A1* | 9/2018 | Gonzalez-Banos | G06F 16/7867 |
| 2019/0182436 A1* | 6/2019 | Gupta | G11B 27/326 |
| 2020/0145590 A1* | 5/2020 | Elboher | G06T 19/006 |

OTHER PUBLICATIONS

Y. Nie, C. Xiao, H. Sun and P. Li, "Compact Video Synopsis via Global Spatiotemporal Optimization," in IEEE Transactions on Visualization and Computer Graphics, vol. 19, No. 10, pp. 1664-1676, Oct. 2013, doi: 10.1109/TVCG.2012.176.*

J. Jin, F. Liu, Z. Gan and Z. Cui, "Online video synopsis method through simple tube projection strategy," 2016 8th International Conference on Wireless Communications & Signal Processing (WCSP), 2016, pp. 1-5, doi: 10.1109/WCSP.2016.7752708.*

J. Zhu, S. Feng, D. Yi, S. Liao, Z. Lei and S. Z. Li, "High-Performance Video Condensation System," in IEEE Transactions on Circuits and Systems for Video Technology, vol. 25, No. 7, pp. 1113-1124, Jul. 2015, doi: 10.1109/TCSVT.2014.2363738.*

* cited by examiner

VIDEO CONDENSATION AND RECOGNITION METHOD AND SYSTEM THEREOF

BACKGROUND OF THE INVENTION

1. Field of the Invention

The present disclosure relates to a video condensation & recognition method and a system thereof, particularly a technique which refers to a non-overlapping video condensation approach with object detection, classification, and search attribute of an object towards user-friendly searching and filtering.

2. Description of Related Art

Currently, the common video surveillance technology for passive monitoring mostly relies on manpower for a very strenuous and fallible job to check a recorded footage and identify some specific targets. Accordingly, a technique to condense a video footage will be utilized to make surveillance video analysis easier and faster.

Moreover, the deep learning method is deployed in the system in form of convolutional neural networks that have been trained through learning process to address the problems.

If a frame in a video is recognized as techniques such as video condensation and deep learning, the trained artificial neural network is applicable to the feature classification of a video for its accurate recognition of video information. Moreover, other functions such as feature labeling and selection that are added properly will further support video surveillance effectively. Accordingly, a video condensation & recognition method and a system thereof can be regarded as a better solution.

SUMMARY OF THE INVENTION

A video condensation & recognition method comprises of following steps:
(1) A set of input frames is processed by foreground-background separation and object detection algorithm to generate background images, and 3D object trajectories;
(2) One or multiple 2D trajectories are extracted from a derived 3D object trajectory wherein a 2D trajectory comprises of one or multiple object tubes;
(3) Any overlap of object tubes at a distinct time position in a 2D trajectory is generated, and used to form the object tube of the moving object; and
(4) Several continuous object tubes are rearranged at the time position without any overlapped to generate the initial condensed video. Moreover several searched attribute of an object is defined for the display of an object correlated with a distinct searched attribute on the condensed video.

Specifically, an object in the present disclosure is detected by a deep learning model.

Specifically, the deep learning model in the present disclosure are Convolutional Neural Networks (CNN) and/or You Only Look Once (YOLO).

Specifically, a 2D trajectory about x-t and/or y-t is formed with a 3D object trajectory projected on the x-axis and/or y-axis.

Specifically, a new object tube can be created with two or multiple object tubes in a 2D trajectory, and the multiple overlapped object tubes merged.

Specifically, the length of an initial condensed video formed by several continuous object tubes is defined by the result of non-overlapping time rearrangement process.

Specifically, a size is defined for each object tube and used as an attribute for search and selection process on a condensed video.

Specifically, an orientation is defined for each object tube and used as an attribute for search and selection process on a condensed video.

Specifically, a color is defined for each object tube and used as an attribute for search and selection process on a condensed video.

Specifically, a class label is defined for each object tube and used as an attribute for search and selection process on a condensed video.

A video condensation & recognition system which is installed in an electronic device comprises an input unit through one or multiple original frames are input; a foreground segment unit which is connected to the input unit used to process the original frame(s) for foreground segments derives one or multiple background images; an object detecting unit which is connected to the foreground segment unit is used to detect and trace an object in segmented background images and derive one or multiple 3D object trajectories; a 2D object extraction unit connected to the object detecting unit is used in a derived 3D object trajectory from which one or multiple 2D trajectories are extracted wherein a 2D trajectory, it comprises one or multiple object tubes. An overlap analysis unit which is connected to the 2D object extraction unit and used to estimate overlapped object tubes of 2D trajectories at distinct time positions, the rearrangement process is done to form a non-overlapping condensed video; an object arrangement unit which is connected to the overlap analysis unit and used in rearrangement of several continuous object tubes incorporates an overlap analysis for different time-shifting; an object search and adjustment unit which is connected to the object tube duration and attributes is used to decide whether an object will be presented in a condensed video based on the object correlation with a distinct searched attribute on the condensed video.

Specifically, the electronic device can be a server device or a computer device.

Specifically, the object detecting unit relies on a deep learning model to detect an object.

Specifically, the deep learning model in the present disclosure is a Convolutional Neural Networks (CNN) and/or You Only Look Once (YOLO).

Specifically, the 2D object extraction unit can extract a trajectory on the 2D x-t and/or the 2D y-t from a 3D object trajectory on the basis of a temporal-spatial domain x-t and/or a temporal-spatial domain y-t.

Specifically, the overlapped object tube that detected during the 2D object extraction process will be merged.

Specifically, the object arrangement unit can adjust the length of a condensed video formed by several continuous object tubes through non-overlapping time shifting process.

Specifically, the size is defined on every object tube as an object attribute for search and selection purpose.

Specifically, the orientation is defined on every object tube as an object attribute for search and selection purpose.

Specifically, the color is defined on every object tube as an object attribute for search and selection purpose.

Specifically, the class label is defined on every object tube as an object attribute for search and selection purpose.

DETAILED DESCRIPTION OF THE PREFERRED EMBODIMENTS

The technical details, features, and effects of a video condensation & recognition method and a system thereof are clearly presented in preferred embodiments and accompanying drawings herein.

Figure 1:
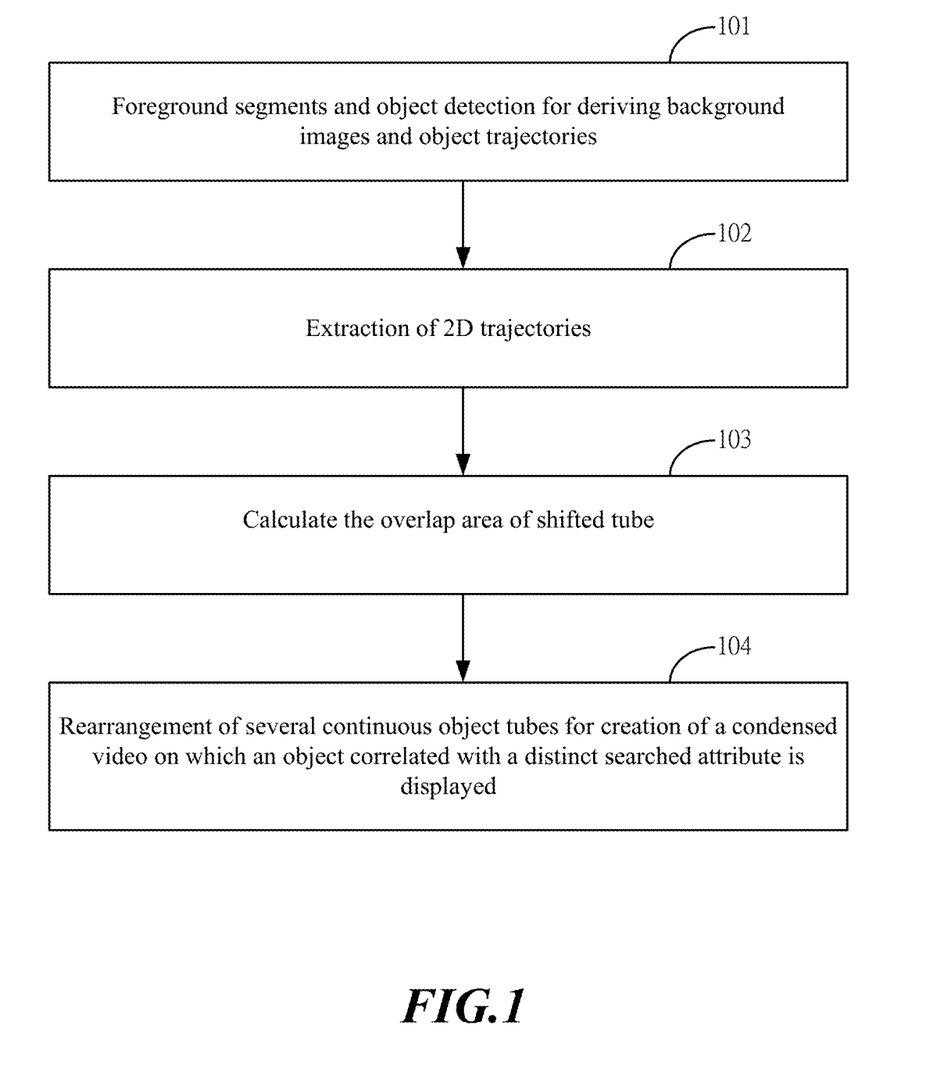
FIG. 1 is a flowchart for a video condensation & recognition method.

Referring to FIG. 1, which is a flowchart for a video condensation & recognition method and a system thereof with steps as follows:
(1) An input frame is processed for foreground segments and object detection through one or multiple background images as well as object trajectories, are derived 101;
(2) One or multiple 2D trajectories are extracted from a derived 3D object trajectory (2D trajectories is provided by projecting 3D to x and y to form x-t and y-t wherein a 2D trajectory comprises of one or multiple object tubes) 102;
(3) During the time-shifting process, the overlap area of shifted tube will be calculated. Any overlapped object tubes at a distinct time position in a 2D trajectory will be shifted again to generate the non-overlapping condensed video 103;
(4) Several continuous object tubes are rearranged at the time position that refers to non-overlapping condition for the creation of a condensed video in which a searched attribute of an object is further classified for the display of an object correlated with a distinct searched attribute on the condensed video 104.

Figure 2:
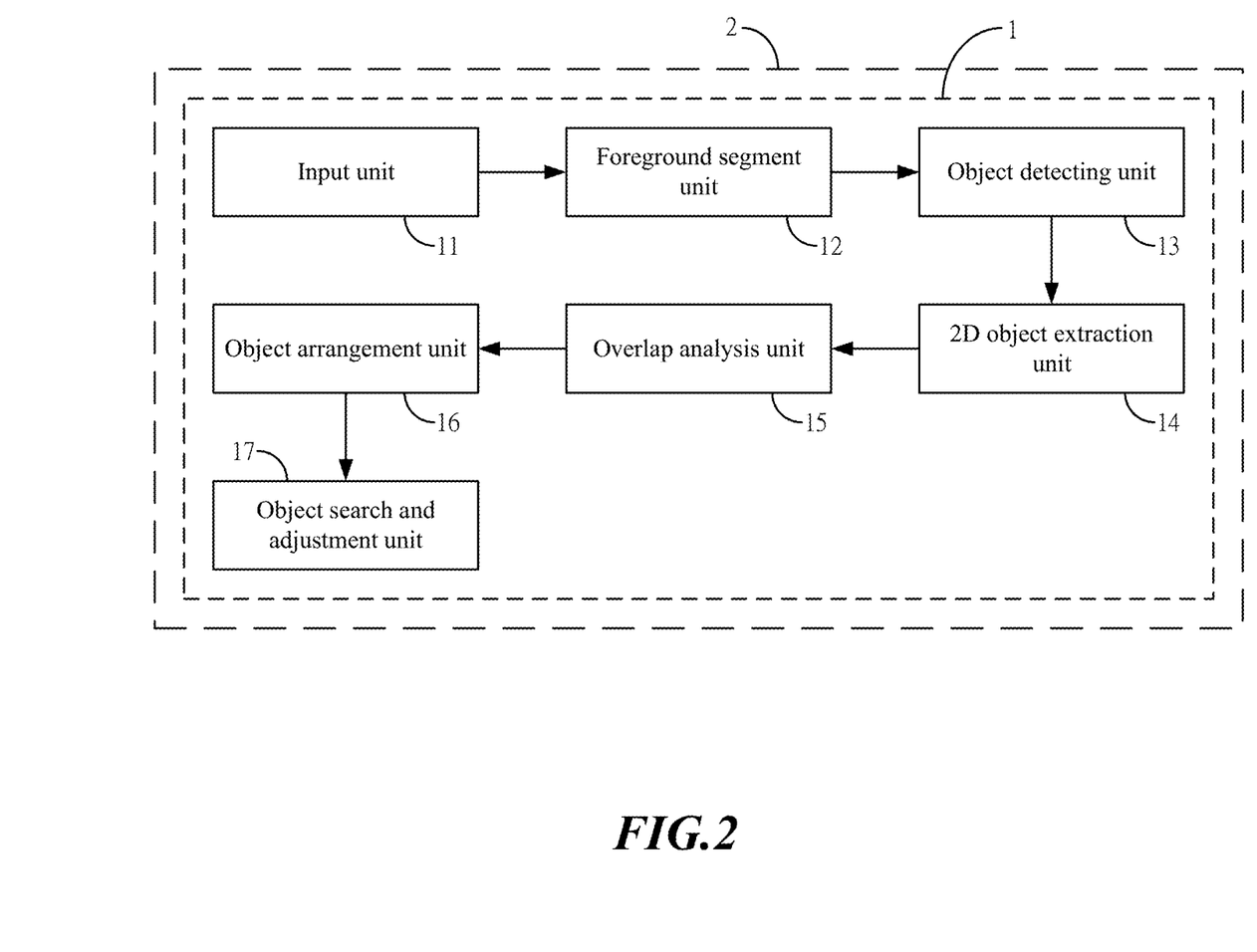
FIG. 2 is a schematic view for the structure of a video condensation & recognition system.

Referring to FIG. 2, which is a schematic view for the structure of a video condensation & recognition method and a system thereof. As shown in FIG. 2, the system 1 is installed in an electronic device 2 (which can be a server device or a computer device) and comprises:
(1) An input unit 11 through which one or multiple original frames are feed to the system;
(2) A foreground segment unit 12 which is connected to the input unit 11 is used to process the original frame(s) for foreground segments and derive one or multiple background images;
(3) An object detecting unit 13 which is connected to the foreground segment unit 12 is used to detect an object in segmented background images (classify and localize an object in a spatial domain) by a deep learning model (for example, a convolutional neural network) and derive one or multiple 3D object trajectories;
(4) A 2D object extraction unit 14 connected to the object detecting unit 13 is used in a derived 3D object trajectory which is further projected on the x-axis and/or the y-axis for creation of a 2D trajectory about x-t and/or y-t based on a temporal-spatial domain x-t and/or a temporal-spatial domain y-t wherein a 2D trajectory comprises one or multiple object tubes; moreover, the 2D object extraction unit 14 is able to merge two or more overlapped object;
(5) An overlap analysis unit 15 which is connected to the 2D object extraction unit 14 is used to calculate the overlapped area of two or more object tubes in 2D trajectories at distinct time positions;
(6) An object arrangement unit 16 which is connected to the overlap analysis unit 15 is used in the rearrangement of several continuous object tubes at a specific time position and create a condensed video which is produced based on different conditions by the object arrangement unit 16, as shown in following subsections:
 (a) The object arrangement unit relies on a time position of a non-overlapping condensation to define the length of a condensed video which is formed by several rearranged continuous object tubes; and
 (b) The object arrangement unit can adjust the length of a non-overlap condensed video formed by several continuous object tubes;
(7) An object search and adjustment unit 17 which is connected to the object arrangement unit 16 is used to classify a searched attribute of an object in a condensed video for the display of an object correlated with a distinct searched attribute on the condensed video, also adjust the object tube again to form a shorter condensed video with more overlapped object presented.

Figure 3A:
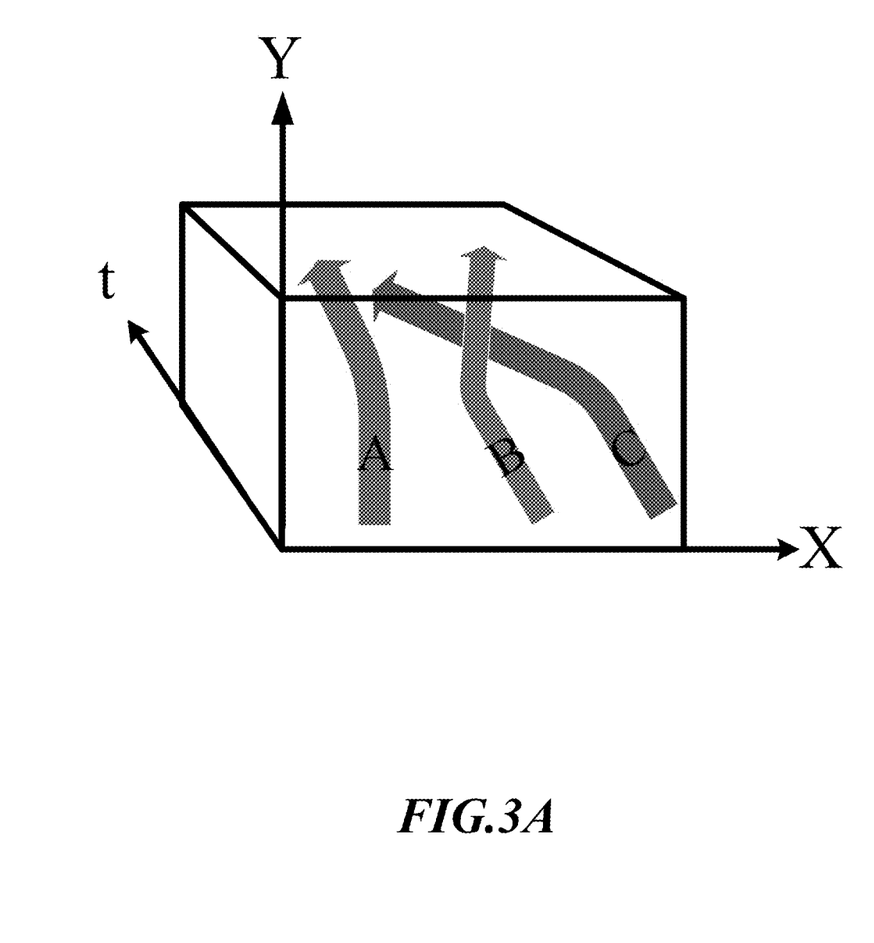
FIG. 3A is a schematic view for 3D object trajectories according to a video condensation & recognition method and system of the present invention.
Figure 3B:
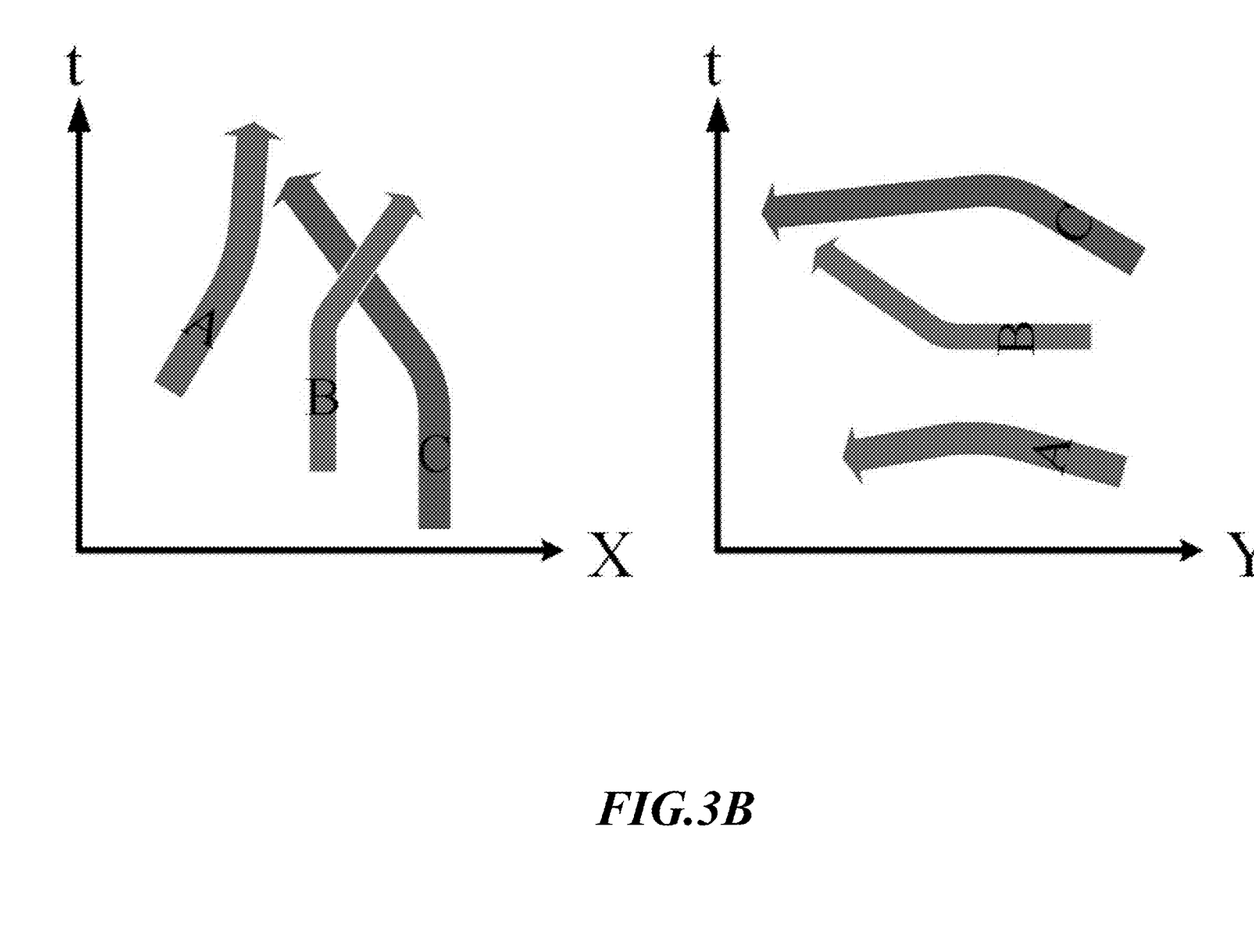
FIG. 3B is a schematic view for 2D trajectories according to a video condensation & recognition method and system of the present invention.
Figure 3C:
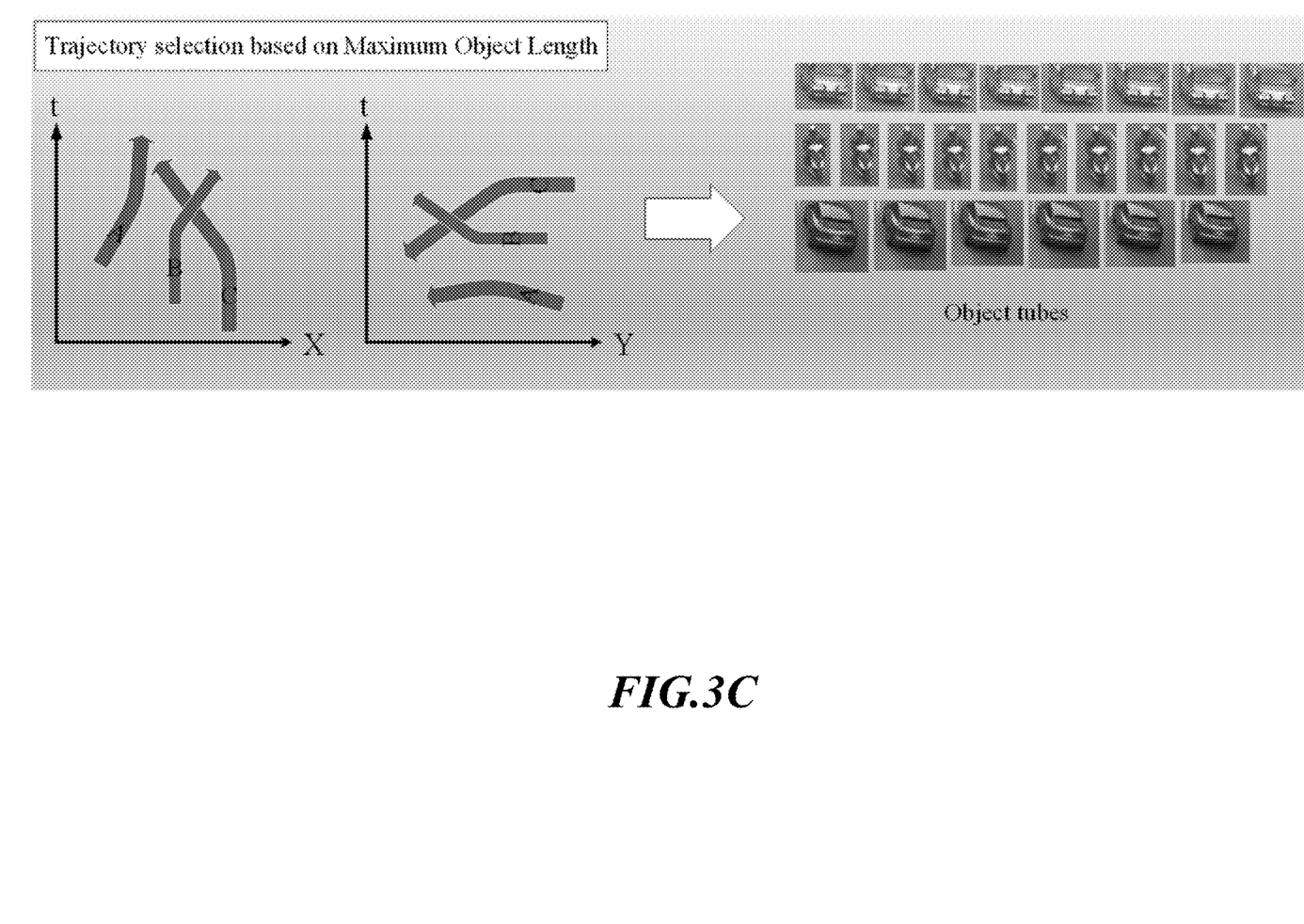
FIG. 3C is a schematic view for comparisons between object trajectories and object images according to a video condensation & recognition method and system of the present invention.

For projections from a 3D object trajectory to 2D object tubes, a 3D object trajectory, as shown in FIG. 3A to 3C, should be transferred to 2D trajectories, each of which comprises of three object tubes that denote three distinct dynamic states at Vo. The present disclosure is based on the temporal-spatial domain x-t and the temporal-spatial domain y-t for position management with which are defined according to steps as follows:
(1) Find out continually objects interval.
(2) Initiate x-t by video's width and time interval, or y-t with video's height.
(3) Used detected mask and original time to draw the corresponding position.

Figure 4:
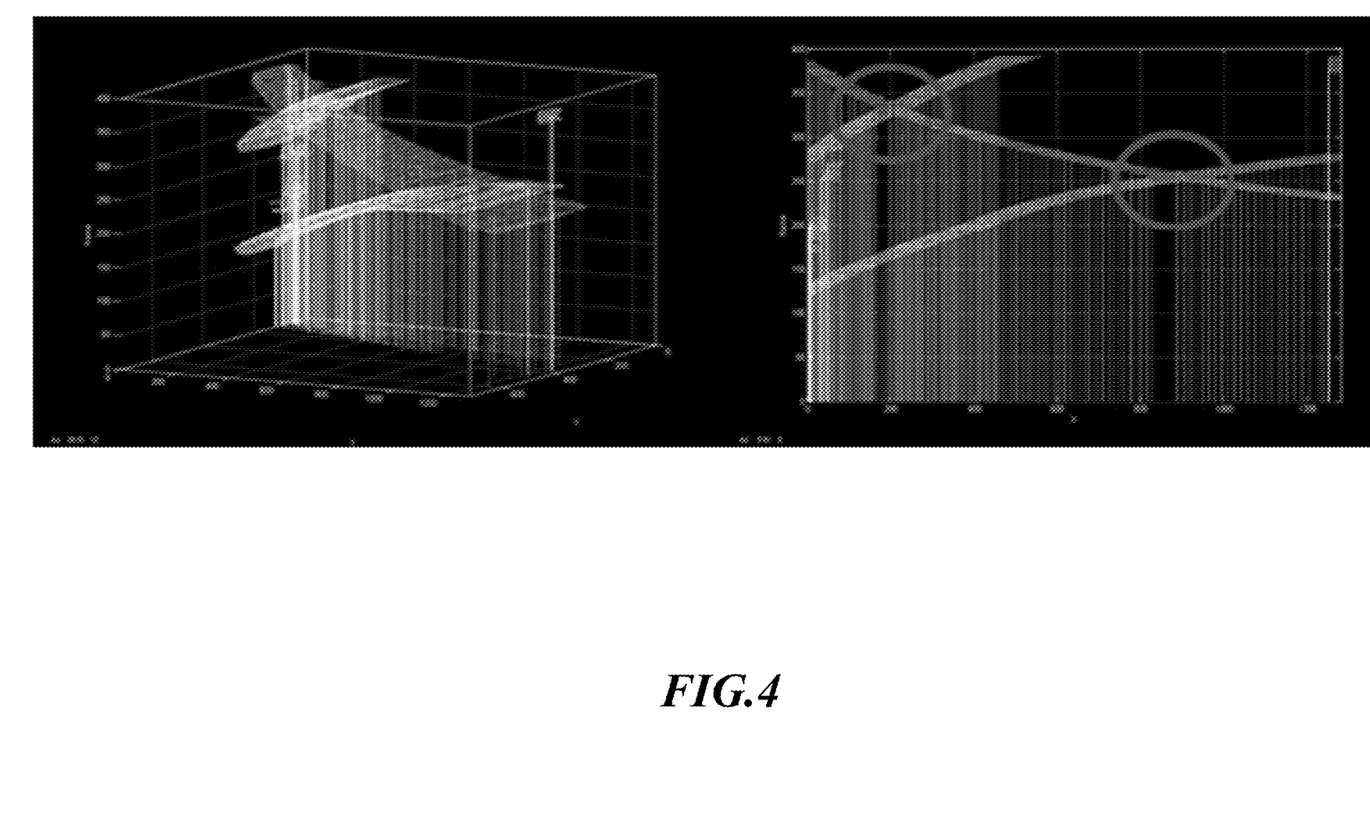
FIG. 4 is a schematic view for object trajectories and overlaps according to a video condensation & recognition method and system of the present invention.

As shown in FIG. 3C, the object tubes in 3D object trajectories are formed by three sets of continuous object images. It can be seen from FIG. 4 for extracted 2D trajectories based on x-t that each of the two points denotes two object tubes overlapping with each other. In the present disclosure, two or more overlapped object tubes are merged.

In the present disclosure, step to produce object tube using connected components algorithm, then define which 2D trajectories are chosen between x-t and y-t, subsequently choose it based on the shortest maximum object length. Finally, with the step of grouping completed, an object is correlated with different object tubes.

It costs much time in the step of processing overlaps. In the present disclosure, an upper limit, $t_{max}$, and a lower limit, $t_{min}$, are defined through the Non-overlapping (NO) algorithm and a global time-shifting module, respectively. Accordingly, a condensed video can be adjusted according to the abovementioned data.

Figure 8A:
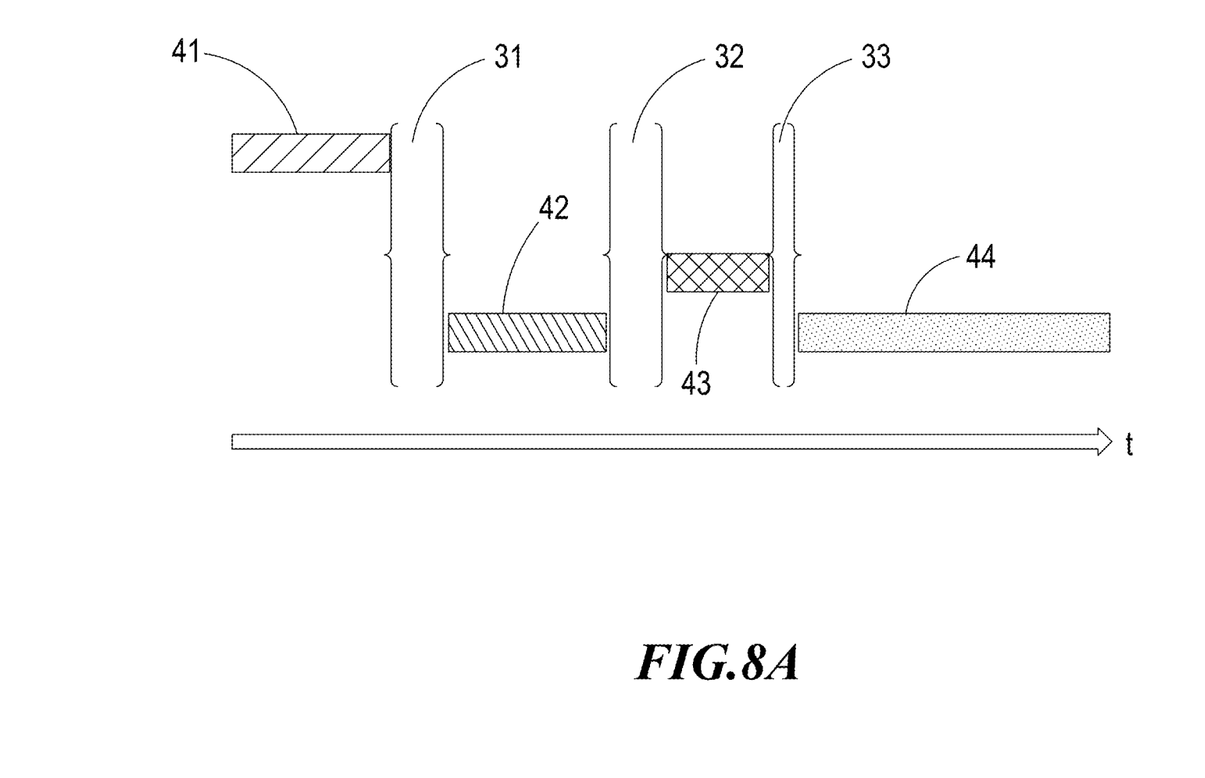
FIG. 8A is a schematic view for adjustment of concentrated time and shifts of object tubes according to a video condensation & recognition method and system of the present invention.
Figure 8B:
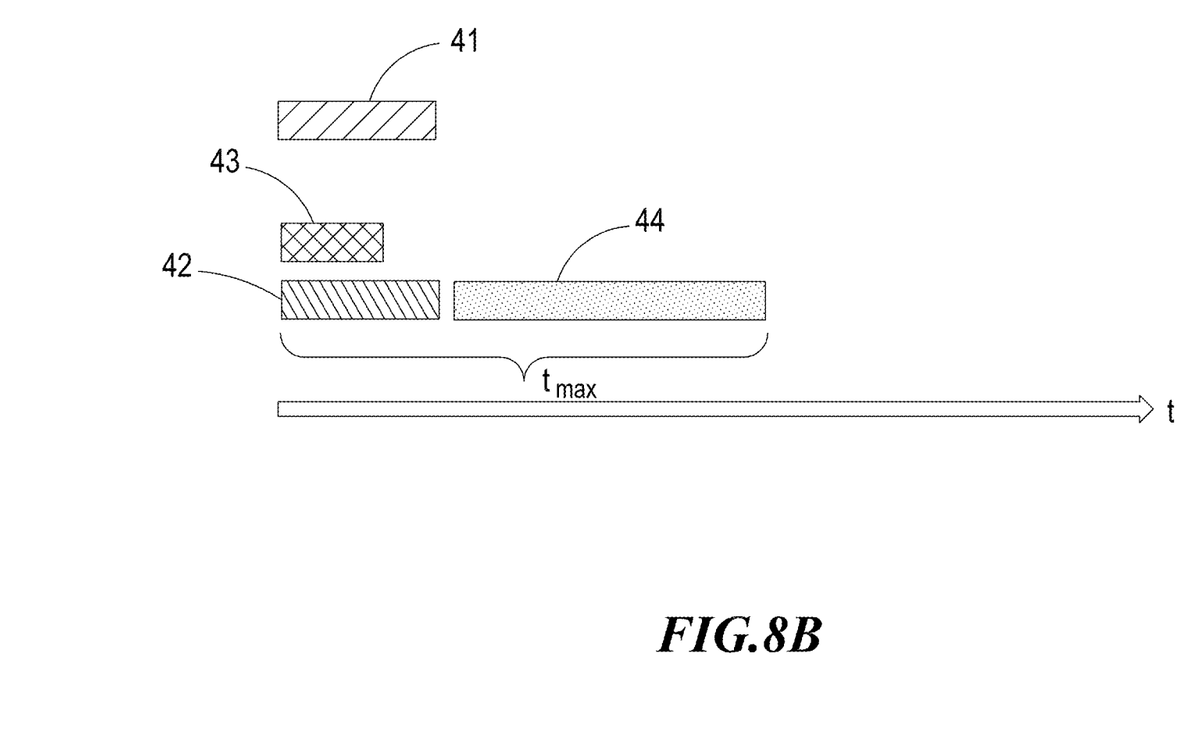
FIG. 8B is a schematic view for adjustment of concentrated time and shifts of object tubes according to a video condensation & recognition method and system of the present invention.
Figure 8C:
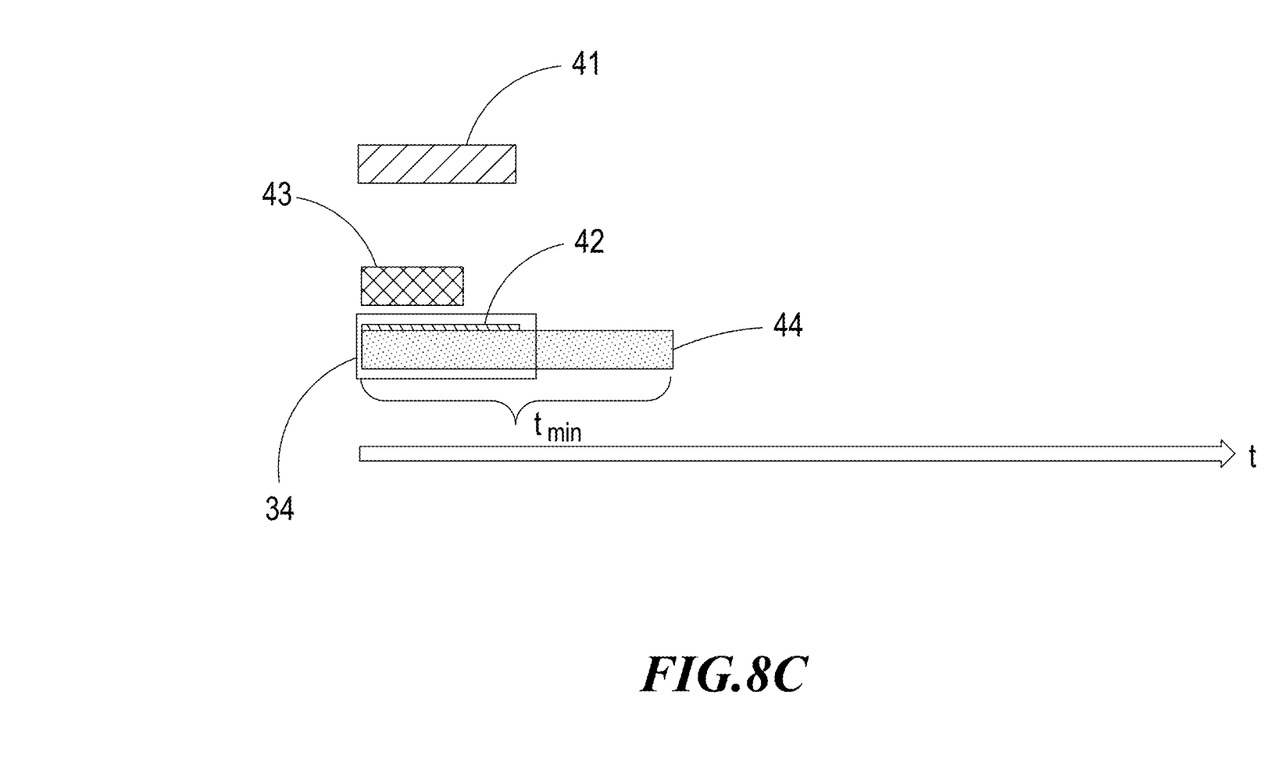
FIG. 8C is a schematic view for adjustment of concentrated time and shifts of object tubes according to a video condensation & recognition method and system of the present invention.

As shown in FIG. 8A to 8C, $t_{min}$ is the time interval of an object tube with the longest time amid multiple continuous object tubes and $t_{max}$ is the time interval of multiple continuous object tubes which do not overlap with each other. Accordingly, $t_{max}$ and $t_{min}$ are defined with the global time-shifting module and all object tubes are shifted through adjustment of concentrated time for the creation of a condensed video in which no object tube is overlapped.

Referring to FIG. 8A, which illustrates an original video with four object tubes, 41, 42, 43 and 44. With residual time 31, 32, 33 in the object tubes 41, 42, 43 and 44 deleted and the object tubes 41, 42, 43 and 44 shifted to the same start point, the object tube 42 and the object tube 44 are placed at the same track such that concentrated time for no object tube overlapped is $t_{max}$, as shown in FIG. 8B. Moreover, referring to FIG. 8C, which illustrates the case for adjustment of concentrated time. When time is concentrated and equal to $t_{min}$, which is defined as the time interval of the object tube 44 with the longest time, a complete overlap is detected because the object tube 42 is covered by the object tube 44.

A condensed video ($V_S(x, y, t_s)$) is created from object tubes with their distinct time positions through corresponding equations as follows:

$$1 \leq t_s \leq \tau_{MIN} < \tau_{MAX} + \max O_i\{M(O_i)\} \quad (1)$$

With the temporal-spatial domains for x and y axes analyzed in the present disclosure, (x, y) it is equivalent to detected mask of an object tube. For the rearrangement of multiple object tubes ($Tube_i$), an initialization step first object tube will be immediately arranged at $t_s=1$ should be conducted. Moreover, in virtue of overlaps to be considered simultaneously, overlap (x, y, t) is defined in the equation as follows:

$$\text{overlap}(x,y,t) = \{\text{overlap}(x,y,t) + 1 | V_s \cap Tube_i\} \quad (2)$$

Additionally, the Non-overlapping (NO) algorithm is conducted, as shown in the following steps:
(1) Put the $Tube_0$ to the $V_S$ at $t_s=1$.
(2) Put the $Tube_i$ to the $V_S$ at $t_s=1$, and compute the amount of overlap.
(3) Check stop condition if no-overlap is presented, go to Step. 5.
(4) Compute the overlap ratio, and put the $Tube_i$ to $V_S$ at $t_s=t_s+1$, go to Step. 3.
(5) Put the object tube to the $V_S$ at $t_s=\arg\min \rho(Tube_i)$.

Figure 5A:
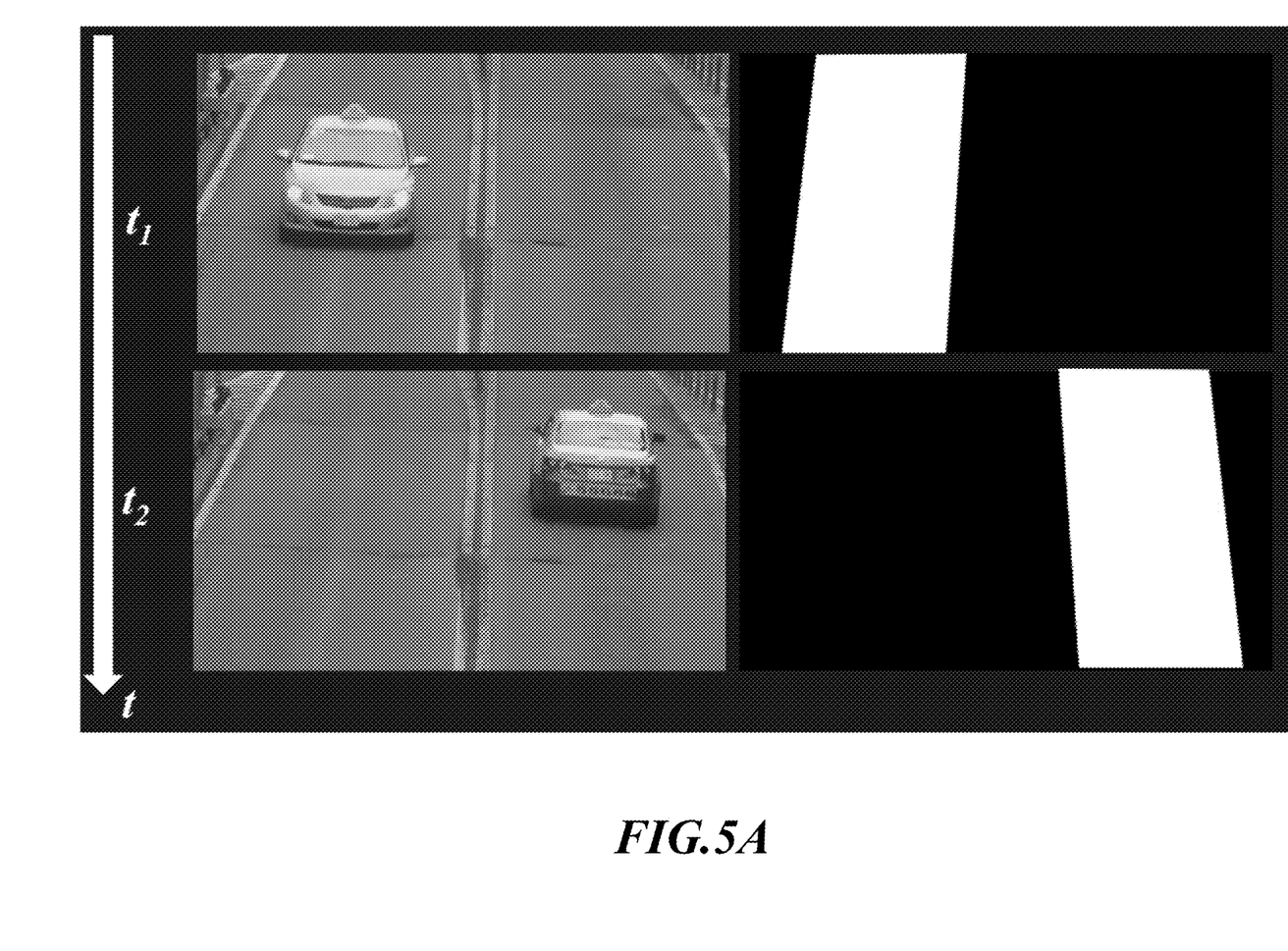
FIG. 5A is a schematic view for a condensed video according to a video condensation & recognition method and a system thereof.
Figure 5B:
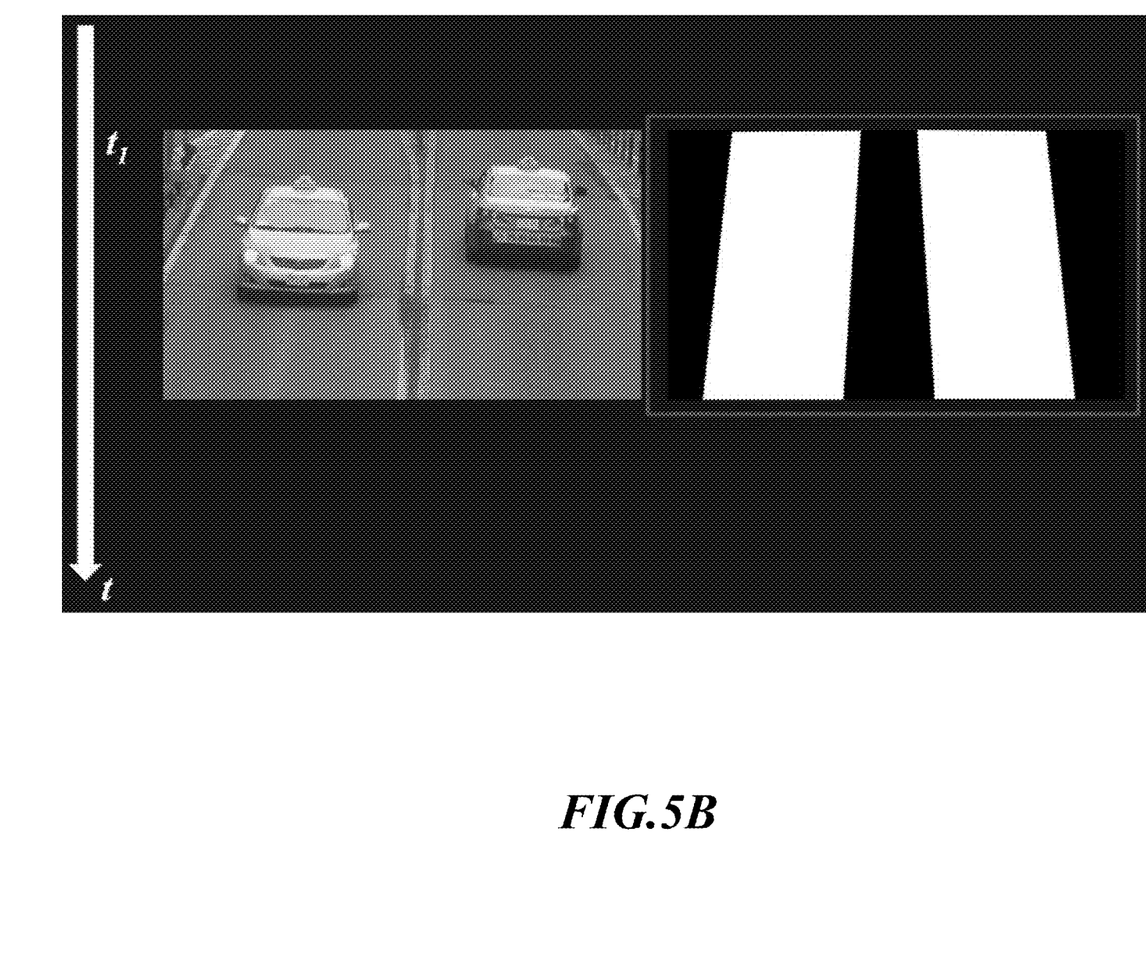
FIG. 5B is another schematic view for a condensed video according to a video condensation & recognition method and a system thereof.

As shown in FIGS. 5A and 5B for the example of a condensed video, object tubes ($Tube_i$) at two different time points are combined into the same frame. For a flexible condensed video, $t_{min}$, which is defined with a global time-shifting module, denotes the longest time of an object tube. Before application of a global time-shifting module, a length L(i) from the start time TS(i) to the end time TE(i) for an object tube ($Tube_i$) should be obtained according to equations as follows:

$$TS(i) = \{\min O_i(M(O_i)|Tube_i\} \quad (3)$$

$$TE(i) = \{\max O_i(M(O_i)|Tube_i\} \quad (4)$$

$$L(i) = TE(i) - TS(i) \quad (5)$$

Moreover, for adjustment unit, a diagonal matrix, $W_{N \times N}$, is adopted in the present disclosure where N is the quantity of object tubes. The corresponding equation for $W_{N \times N}$ is:

$$W_{ii} = TS(i)/\tau_{MAX} - L(i) \quad (6)$$

In addition, when the length of a notch between two object tubes, $\tau_i$, is to be changed, information for a new start time position of each object tube will be recorded as $S_{N \times 1}$. For application of a global time-shifting module, a length matrix, $LT_{N \times 1}$, based on the equation of $[L(0), \ldots, L(N)]$, for an object tube should be defined in advance. The equation for global time-shifting is shown as follows:

$$S = W[\tau_i 1^T - LT] \quad (7)$$

In the present disclosure, different object tubes can be distinguished from one another by size and marked based on percentile rank (PR), as shown in equations as follows:

$$\text{Sizemark of } Tube_i = \begin{cases} 0, & 0\% < PR \text{ of } Tube_i \leq 25\% \\ 1, & 25\% < PR \text{ of } Tube_i \leq 50\% \\ 2, & 50\% < PR \text{ of } Tube_i \leq 75\% \\ 3, & 75\% < PR \text{ of } Tube_i \leq 99\% \end{cases} \quad (8)$$

Figure 6:
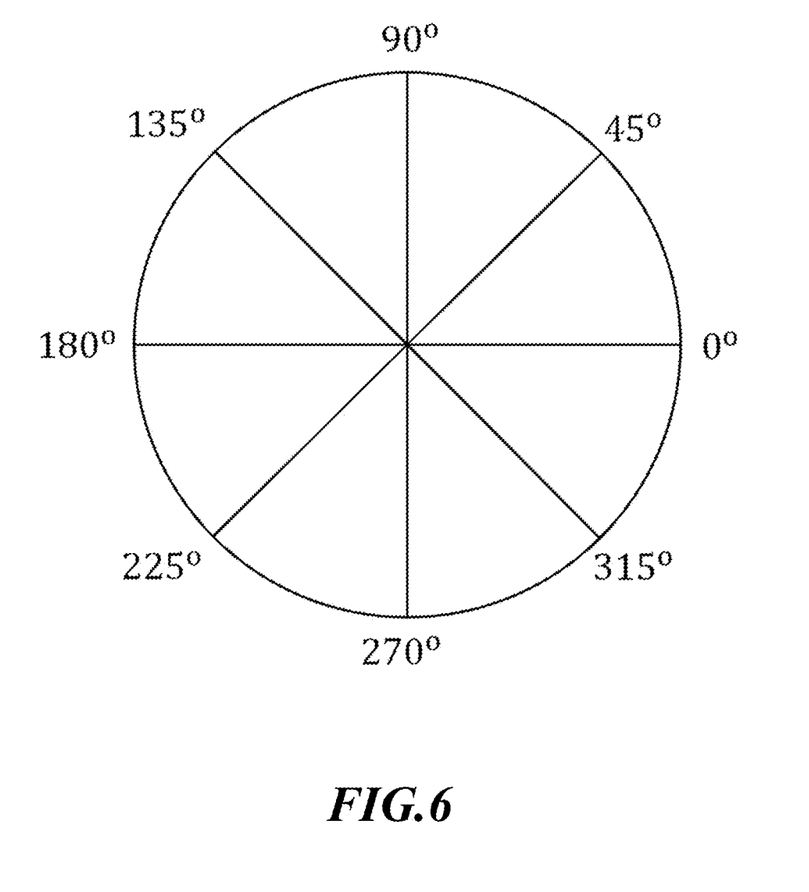
FIG. 6 is a schematic view for orientations defined in a video condensation & recognition method and a system thereof.

In the present disclosure, different object tubes can be further distinguished from one another according to their orientations. As shown in FIG. 6, there are eight orientations, which are divided in the present disclosure but not limited to 0, 45 degrees, 90 degrees, 135 degrees, 180 degrees, 225 degrees, 270 degrees, and 315 degrees, to define a head endpoint H and a rear endpoint R of an object tube and find the slope of an object tube. The corresponding equations are shown as follows:

$$\text{Slop of } tube_i = \tan^{-1} \frac{R\{Blob^R(y)\} - H\{Blob^H(y)\}}{R\{Blob^R(x)\} - H\{Blob^H(x)\}} \quad (9)$$

With a head endpoint H and a rear endpoint R of an object tube calculated, the slope of an object tube is found and compared with eight orientations. After the orientation of an object tube ($Tube_i$) is determined, the orientation data can be correlated with a certain object tube ($Tube_i$).

Figure 7:
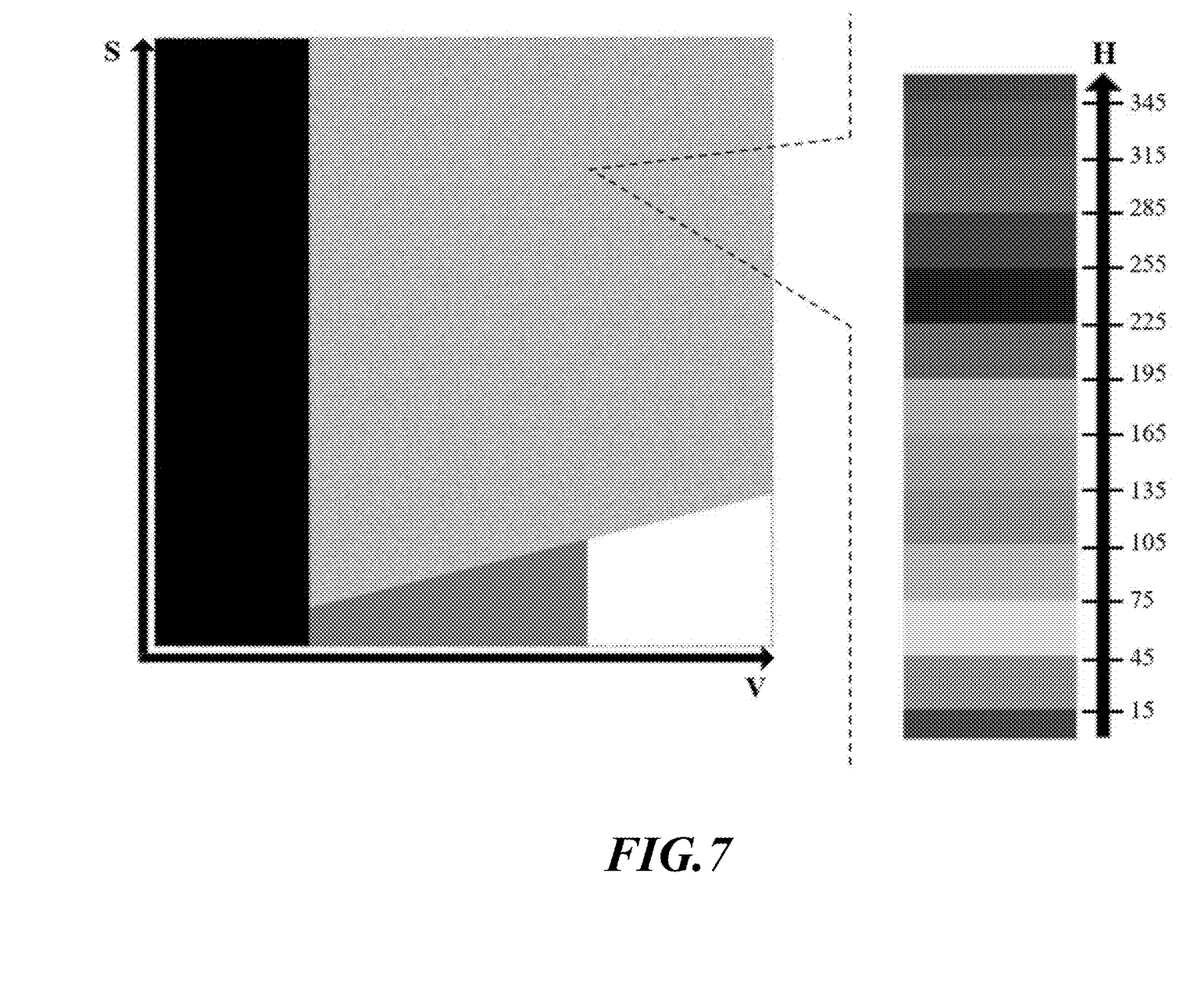
FIG. 7 is a schematic view for colors defined in a video condensation & recognition method and a system thereof.

In the present disclosure, different object tubes can be distinguished from one another according to their colors. As shown in FIG. 7, RGB (Red, Green, Blue) color space is mapped into HSV (Hue, Saturation, Value) color space for separations of 15 colors according to the lookup table (LUT) and an association is establishment between an object represented by object tubes and different colors. With a specific color selected, object tubes correlated with the specific color are collected and a frame for an object represented by the object tubes is displayed.

Additionally, with several parameters input simultaneously, object tubes that match the required parameters are collected and a frame of an object represented by the object tubes is displayed.

The details for "A Video Condensation & Recognition Method and a System Thereof" in the present disclosure (hereinafter referred to as "patent application") and other existing techniques including Pritch et al., 2008 (Y. Pritch, A. Rav-Acha, and S. Peleg, "Nonchronological Video Synopsis and Indexing," IEEE Trans. Pattern Analysis and Machine Intelligence, vol. 30, no. 11, pp. 1971-1987, November 2008), Huang et al., 2014 (C.-R Huang, P.-C Chung, D.-K Yang, H.-C Chen, and G.-J Huang, "Maximum a posteriori probability estimation for online surveillance video synopsis", IEEE Transactions on circuits and systems for video technology, vol. 24, no. 8, August 2014) and He et al., 2017 (Yi He, Zhiguo Qu, Changxin Gao, and Nong Sang, "Fast Online Video Synopsis Based on Potential Collision Graph", IEEE Signal Processing Letters., vol. 24, no. 1, January 2017), all of which are analyzed and compared herein, are summarized in the table below:

|  | Pritch et al., 2008 | Huang et al., 2014 | He et al., 2017 | Patent application |
|---|---|---|---|---|
| Object tube | Blob-to-blob | Blob-to-blob | Sticky tracking | Trajectory-based grouping |
| Tube rearrange | Global optimization | Sequentially optimization | Sequentially optimization | Sequentially optimization |
| Synopsis length | User defined | Algorithm defined | Algorithm defined | Trade-off between both |

Table 1, details for the patent application and other existing techniques analyzed and compared herein A video condensation & recognition method and a system thereof provided in the present disclosure have the following advantages in contrast to other traditional techniques:

(1) The technique for image recognition through video condensation and deep learning in the present disclosure can be used for classifications of features in a video, correct recognition of video information and effective video surveillance based on the extra function of feature labeling and selection.

(2) The technique is used to derive a time position for non-overlapped object tubes and a condensed video is created for eliminating excessive steps and saving significant time during the processing of overlapped trajectories.

(3) The technique is able to shorten the non-overlapped initial condensed video based on user need, through proposed adjustment unit which introduce denser and overlapped object.

The preferred embodiments hereof are not taken as examples to restrict the scope of a video condensation & recognition method and a system thereof in the present disclosure. Any brief or equivalent change/modification made by the skilled persons who familiarize themselves with the above technical features and embodiments without departing from the spirit and scope of the present disclosure should be covered in claims of the patent specification.

What is claimed is:

1. A video condensation and recognition method comprising the following steps:
   processing a set of input frames for foreground segmentation and object detection to generate one or multiple background images, as well as one or multiple 3D object trajectories;
   extracting one or multiple 2D trajectories from each of the one or multiple 3D object trajectories, wherein each of the one or multiple 2D trajectories comprises one or multiple object tubes based on a temporal-spatial domain x-t with information of object's width and/or a temporal-spatial domain y-t with information of the object's height, wherein a new object tube is created with multiple object tubes in the one or multiple 2D trajectories overlapped by merging overlapped multiple object tubes;
   calculating an overlap of object tubes at a distinct time position in the one or multiple 2D trajectories and setting an upper limit for the overlap for extracting a time position that refers to a non-overlapping condition; and
   rearranging several continuous object tubes at the time position that refers to the non-overlapping condition for creating a condensed video in which a searched attribute of an object is further classified for displaying the object correlated with a distinct searched attribute on the condensed video; wherein the non-overlapping condition is achieved according to the following steps:
   (1) putting $Tube_0$ to $V_S$ at $t_s=1$;
   (2) putting $Tube_i$ to the $V_S$ at $t_s=1$, and computing an amount of overlap arg min $\rho(Tube_i)$;
   (3) checking stop condition if non-overlap is presented, going to Step (5);
   (4) putting the $Tube_i$ to the $V_S$ at $t_s=t_s+1$ and computing an overlap ratio, going to Step (3); and
   (5) putting the object tube to the $V_S$ at $t_s=$arg min $\rho(Tube_i)$; wherein $V_S$ is the condensed video, and $Tube_i$ are the continuous object tubes.

2. The video condensation and recognition method as claimed in claim 1 wherein the object is detected by a deep learning model.

3. The video condensation and recognition method as claimed in claim 2 wherein the deep learning model is a Convolutional Neural Networks (CNN) and/or You Only Look Once (YOLO).

4. The video condensation and recognition method as claimed in claim 1 wherein the length of the condensed video formed by several continuous object tubes is adjusted according to the time position that refers to the non-overlapping condition for no more overlapped object tube.

5. The video condensation and recognition method as claimed in claim 1 wherein a size is marked on a distinct object tube and selected for display of a distinct object on the condensed video.

6. The video condensation and recognition method as claimed in claim 1 wherein an orientation is defined for a distinct object tube and selected for display of a distinct object on the condensed video.

7. The video condensation and recognition method as claimed in claim 1 wherein a color is defined for a distinct object tube and selected for display of a distinct object on the condensed video.

8. The video condensation and recognition method as claimed in claim 1 wherein a class is defined for a distinct object tube and selected for display of a distinct object on the condensed video.

9. A video condensation and recognition system, installed in an electronic device and comprising:
- an input unit for inputting multiple original frames;
- a foreground segment unit which is connected to the input unit and used to process the original frames for foreground segmentation and derive one or multiple background images;
- an object detecting unit which is connected to the foreground segment unit and used to detect and track an object in the one or multiple segmented background images and derive one or multiple 3D object trajectories;
- a 2D object extraction unit connected to the object detecting unit and used in the 3D object trajectory from which one or multiple 2D trajectories are extracted wherein each of the one or multiple 2D trajectory comprises one or multiple object tubes based on a temporal-spatial domain x-t with information of object's width and/or a temporal-spatial domain y-t with information of the object's height, wherein a new object tube is created with multiple object tubes in the one or multiple 2D trajectory overlapped by merging overlapped multiple object tubes;
- an overlap analysis unit which is connected to the 2D object extraction unit and used to estimate overlapped object tubes of the one or multiple 2D trajectories at distinct time positions, set an upper limit for the overlapped object tubes and catch a time position that refers to a non-overlapping condition;
- an object arrangement unit which is connected to the overlap analysis unit and used in the rearrangement of several continuous object tubes at the time position that refers to the non-overlapping condition and creation of a condensed video; and
- an object search and adjustment unit which is connected to the object arrangement unit and used to classify a searched attribute of an object in the condensed video for the display of an object correlated with a distinct searched attribute on the condensed video; wherein the non-overlapping condition is achieved according to the following steps:

(1) putting $Tube_0$ to $V_S$ at $t_s=1$;
(2) putting $Tube_i$ to the $V_S$ at $t_s=1$, and computing an amount of overlap arg min $\rho(Tube_i)$;
(3) checking stop condition if non-overlap is presented, going to Step (5);
(4) putting the $Tube_i$ to the $V_S$ at $t_s=t_s+1$ and computing an overlap ratio, going to Step (3); and
(5) putting the object tube to the $V_S$ at $t_s$=arg min $\rho(Tube_i)$; wherein $V_S$ is the condensed video, and $Tube_i$ are the continuous object tubes.

10. The video condensation and recognition system as claimed in claim 9 wherein the electronic device can be a server device or a computer device.

11. The video condensation and recognition system as claimed in claim 9 wherein the object detecting unit relies on a deep learning model to detect the object.

12. The video condensation and recognition system as claimed in claim 9 wherein the object arrangement unit adjusts the length of the condensed video formed by the several continuous object tubes according to the time position that refers to the non-overlapping condition for no more overlapped object tube.

13. The video condensation and recognition system as claimed in claim 9 wherein a size is marked on a distinct object tube by the object search and adjustment unit and selected for display of a distinct object on the condensed video.

14. The video condensation and recognition system as claimed in claim 9 wherein an orientation is defined for a distinct object tube by the object search and adjustment unit and selected for the display of a distinct object on the condensed video.

15. The video condensation and recognition system as claimed in claim 9 wherein a color is defined for a distinct object tube by the object search and adjustment unit and selected for display of a distinct object on the condensed video.

16. The video condensation and recognition system as claimed in claim 9 wherein a class is defined for a distinct object tube by the object searched-attribute classification unit and selected for display of a distinct object on the condensed video.

* * * * *